July 24, 1973 W. KELLER 3,748,169
METHOD AND APPARATUS FOR THE PRODUCTION OF HOLLOW MEMBERS OF ANY LENGTH OF SEMICONDUCTOR MATERIAL
Filed March 15, 1972
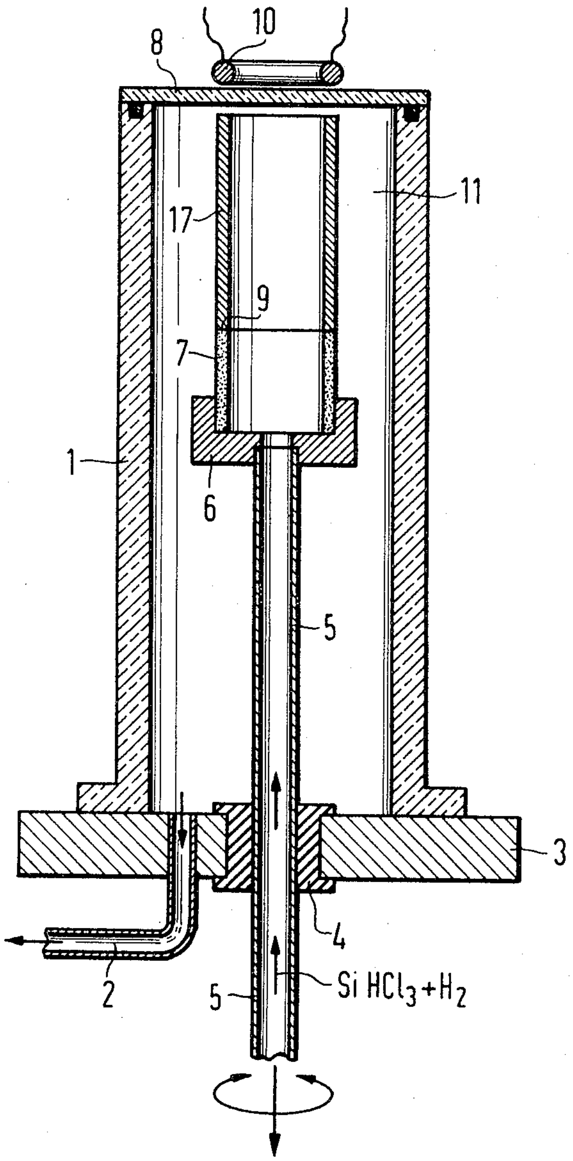

United States Patent Office 3,748,169

Patented July 24, 1973

3,748,169

METHOD AND APPARATUS FOR THE PRODUCTION OF HOLLOW MEMBERS OF ANY LENGTH OF SEMICONDUCTOR MATERIAL

Wolfgang Keller, Munich, Germany, assignor to Siemens Aktiengesellschaft

Filed Mar. 15, 1972, Ser. No. 234,975
Claims priority, application Germany, Apr. 14, 1971, P 21 17 933.9
Int. Cl. C23c *11/00, 11/06*
U.S. Cl. 117—106 A 16 Claims

ABSTRACT OF THE DISCLOSURE

A method for the production of hollow members of semiconductor material of any length by thermal decomposition of a gaseous compound containing semiconductor material is described. Preferably, a hollow member of graphite or silicon is employed as a carrier on the frontal surface of which semiconductor material is deposited in response to the creation of a temperature gradient along the carrier member. The hollow member is moved out of the depositing zone at the rate of deposition of the semiconductor material.

BACKGROUND OF THE INVENTION

Field of the invention

This invention relates to a method and apparatus for producing hollow semiconductor members of any length by thermally decomposing a gaseous compound containing semiconductor material and depositing the semiconductor material on carriers arranged in a reaction chamber.

Description of the prior art

Methods for producing hollow members, especially tubes, of semiconductor material are known in the art. For example, it is known from the German Letters Pat. 1,061,593 to produce a silicon rod by thermally decomposing a silicon compound and depositing the silicon on a silicon carrier, and thereafter mechanically boring out the rod so produced. This method, however, causes a great loss of material.

According to another method described in the German Offenlegungsschrift 1,805,970 the procedure for producing hollow members of semiconductor material involves the use of a carrier member of heat resistant material, for example graphite, tantalum, molybdenum or ceramic, on the outer surfaces of which semiconductor material is deposited due to the thermal decomposition of a gaseous semiconductor compound. The carrier member, consisting of foreign material, is mechanically and/or chemically removed without destroying the deposited semiconductor layer. By means of this procedure it is possible to produce two opposite side open members, that is, tubes of silicon. Such silicon tubes are employed as diffusion chambers for gas and solid state body diffusion of semiconductor crystals and are preferred, due to their purity, temperature stability and temperature resistance, to the common diffusion tubes made of quartz, graphite or ceramic.

Tubes produced according to the above technique are limited, however, in length by the length of the device in which they are produced. For diffusions of large surface components, for example, where a large diffusion area is required, or for the diffusion of higher quantities of crystals, such tubes are no longer sufficient and one must again resort to the conventional tubes made of quartz or other tubes which have disadvantages of causing pollution.

SUMMARY OF THE INVENTION

The present invention overcomes the above problem and achieves the object of providing for the production of hollow semiconductor members, particularly silicon tubes, of any length whereby the danger of pollution during subsequent diffusion processes, either due to a carrier member used during production or to other influences, is kept as low as possible.

According to the present invention, it is suggested that as a carrier member a corrosion resistant hollow member is used, the member being open on one side. A heating arrangement provides an axial temperature gradient so that material deposition takes place only at the open frontal side of the hollow member and the hollow member, serving as a carrier member, is moved out of the depositing zone at a rate corresponding to the rate of deposition of the semiconductor material.

By the use of a hollow member, made of graphite, or according to the procedure set forth in Offenlegungsschrift 1,805,970 a hollow member of silicon, as the initial carrier member for receiving the deposition, by depositing material only at one frontal surface of the hollow member, and by pulling the carrier away from below the deposition zone at a rate corresponding to the deposition rate, the production of tubes of any length sufficient for the requirements of a diffusion in the semiconductor material is achieved.

It is within the scope of this invention to utilize an induction heating coil, energized to provide a high frequency alternating field, as the heating apparatus for thermal decomposition. The heating coil has a diameter adapted to the diameter of the hollow member, or to the cross-sectional dimensions in the case of hollow members which are not round. In this way it is possible to vary any and all diameters as well as non-circular cross sections. The induction coil is arranged in such a way that at the upper frontal surface of the hollow member, which is held vertically in the reaction chamber, for example a graphite or silicon tube, there is a strictly axial temperature drop; therefore, the hollow members for the silicon tube can only be grown axially and the diameter thereof corresponds to that of the induction heating coil.

When using high ohmic silicon as the material of the carrier member, the member must be preheated so that the silicon itself becomes conductive. Preheating may be accomplished, for example, by means of a glow discharge.

BRIEF DESCRIPTION OF THE DRAWING

Other objects, features and advantages of the invention, its organization, construction and operation will be best understood from the following detailed description of an exemplary embodiment thereof, taken in conjunction with the accompanying drawing on which the single figure is an elevational view, in section, of apparatus for practicing the present invention.

DESCRIPTION OF THE PREFERRED EMBODIMENT

Referring to the drawing, the device shown comprises a silver V2A steel or quartz bell 1 having a base plate 3 made of corrosion resistant material such as quartz, silver or V2A steel. The base plate 3 has a gas discharge opening 2. Through the base plate 3 a tube 5 made of a corrosion resistant metal, such as a V2A alloy is directed by means of a sealing or packing gasket 4 into the interior of a reaction chamber 11. A corrosion resistant holder 6 is mounted at the upper end of the tube 5 for receiving and holding a hollow carrier member 7. The carrier member 7 may be, for example, graphite. The tube 5 with the ring-shaped holder 6 can be moved up and down axially by means of a drive (not shown) and can also be provided with a rotary motion as indicated by the arrows.

The quartz bell 1 is provided with a cover in the form of a quartz plate 8 which is connected in a gas tight manner with the bell 1. An induction heating coil 10 is located adjacent the cover 8 and is energized to heat the frontal area 9 of the hollow graphite member 7 to a depositing temperature. The diameter of the heating coil 10 is adapted to the diameter of the hollow silicon member 17 which is to be produced.

During operation the graphite tube 7 is initially positioned so that its frontal surface 9 is located in the upper part of the reaction chamber 11 adjacent the cover plate 8.

A gaseous compound comprising a mixture of silicon-chloroform [$SiHCl_3$] and hydrogen [$H_2$] is induced into the reaction chamber 11 through the base plate 3 via the tube 5. At the frontal surface 9 of the carrier member 7 which is heated by the induction heating coil 10 to a temperature lying between 1050° C. and 1250° C. the mixture of $SiHCl_3$ and $H_2$ is decomposed and silicon is deposited. The residual gas is discharged from the reaction chamber 11 through the exhaust opening 2. As silicon deposition progresses on the frontal surface 9 (and on the projected surface of the growth) the tube 5 is rotated and the member 7 (and the growth 17) is pulled away from the deposition zone via the holding device 6 and the tube 5 at a rate corresponding to the rate of deposition; here, the pulling speed is 0.3 to 3 mm./min. in the instant example.

In the case of depositing 10 g./hr., for example, for a 25 mm. diameter, a tube 17 of 3 mm. thickness grows to a length of 80 mm.

In order to provide as dense a structure as possible, it may be advantageous to subject the tube to a zone-wise melting after the deposition process. However, it is also possible to cut and to melt alternately. Thereby the entire arrangement is turned by 180° so that the heating zone is located below. If necessary, the initial carrier member 7 made of graphite, can also be separated from the tube 17.

By the application of water cooled short circuit rings within or on the outside of the growing silicon tube 17 the heating field gradient can be more improved.

The invention is not limited only to the production of hollow silicon members of any length, but can also be used for other materials which can be deposited by thermal decomposition.

The present invention can also be used for lengthening hollow members produced by other methods such as set forth in German Offenlegungsschrifts 1,917,016 and 1,805,970 as well as in prior German applications 20 16 339.7, 20 22 025.1, 20 50 076.9 and 20 59 360.9.

Although I have described my invention by reference to a specific illustrative embodiment thereof, many changes and modifications thereof may become apparent to those skilled in the art without departing from the spirit and scope of my invention. It is therefore to be understood that I intend to include within the patent warranted hereon, all such changes and modifications as may reasonably and properly be included within the scope of my contribution to the art.

I claim:

1. A method for producing a hollow member of any length made of semiconductor material by thermal decomposition of a gaseous compound containing the semiconductor material and depositing the semiconductor material on a hollow carrier member arranged within a reaction chamber and having an open end and a second end carried in a holder comprising the steps of:

feeding the gaseous compound containing a semiconductor material through the hollow member;

heating the hollow member with a high frequency alternating field and establishing an axial temperature gradient along the hollow member so that semiconductor material is deposited only on the open end of the hollow member; and moving the hollow member away from the deposition zone at a rate corresponding to the rate of deposition so as to progressively deposit a hollow semiconductor member.

2. The method of claim 1, wherein the steps of heating is further defined as heating with an induction heating coil having a diameter corresponding to the diameter of the hollow member.

3. The method of claim 1, wherein the step of heating is further defined as heating with an induction heating coil having the same cross sectional dimensions as the hollow member.

4. The method of claim 1, comprising the step of providing a tubular carrier member of graphite material.

5. The method of claim 1, comprising the step of providing a tubular carrier member of silicon.

6. The method of claim 1, comprising the step of feeding a mixture of silicon-chloroform and hydrogen as the gaseous compound for thermal decomposition.

7. The method of claim 1, further comprising the step of preheating the open end of the carrier member by creating a glow discharge.

8. The method of claim 1, comprising the step of rotating the carrier member and growth during the growing and moving process.

9. The method of claim 1, wherein the step of moving is further defined as withdrawing the carrier from the depositing zone at a rate of from between 0.3 to 3 mm./min.

10. The method of claim 1, wherein the step of feeding is further defined as feeding a gaseous compound containing silicon for deposition, and the deposition rate is 10 g./hr.

11. The method of claim 1, comprising the step of melting the material after deposition in zones.

12. The method of claim 1, comprising the step of increasing the axial temperature gradient by cooling the hollow members away from the deposition zone.

13. A device for producing a hollow member of any length made of semiconductor material, comprising:

a bell of corrosion resistant material having two ends and defining a reaction chamber;

a quartz plate closing one end of said bell;

a base plate closing the other end of said bell and having a discharge opening and a gas intake opening;

a hollow tube of corrosion resistant material extending through said intake opening and mounted therein for rotary and axial movement, said hollow tube providing a gas intake channel for carrying a gaseous compound containing a semiconductor material;

a hollow carrier member;

a hollow holder of corrosion resistant material for mounting said hollow carrier member carried in fluid communication relationship on said hollow tube for passage of the gas through said carrier member to the distal end thereof; and an induction heating coil disposed outside of said bell adjacent said quartz plate and energizable to heat a zone between the distal end of the combined structure of said carrier member and deposit thereon for thermal decomposition of the gas and deposition on the carrier member-deposit structure.

14. A device according to claim 13, wherein said bell, said base plate and said hollow tube comprise at least a coating of silver.

15. A device according to claim 13, wherein said bell, said base plate and said hollow tube comprise at least a coating of a V2A steel alloy.

16. A device according to claim 13, comprising at least one water cooled ring adjacent said hollow member.

References Cited

UNITED STATES PATENTS

| | | | |
|---|---|---|---|
| 3,425,878 | 2/1969 | Dersin et al. | 117—106 A |
| 3,642,545 | 2/1972 | Pammer et al. | 117—106 A |

ALFRED L. LEAVITT, Primary Examiner

J. W. MASSIE, Assistant Examiner

U.S. Cl. X.R.

117—106 R, 107.2 R, 125; 118—48, 49, 49.1; 264—81